United States Patent [19]

Bianco

[11] Patent Number: 4,905,173
[45] Date of Patent: Feb. 27, 1990

[54] HARDENED SHOP-FLOOR DATA TERMINAL

[76] Inventor: James S. Bianco, 217 Brainard Rd., Enfield, Conn. 06082

[21] Appl. No.: 130,161

[22] Filed: Dec. 8, 1987

[51] Int. Cl.⁴ .............................................. G06C 5/02
[52] U.S. Cl. .................................... 364/708; 235/1 D
[58] Field of Search ........... 364/708; 235/1 D, 145 R; 200/5 A; 340/365 R; 379/368, 369; 341/22

[56] References Cited

U.S. PATENT DOCUMENTS

| | | | |
|---|---|---|---|
| 4,396,830 | 8/1983 | Isozaki et al. | 235/145 R |
| 4,527,149 | 7/1985 | Swensen | 340/365 R |
| 4,650,934 | 3/1987 | Burke | 200/5 A |
| 4,703,161 | 10/1987 | McLean | 235/1 D |
| 4,760,217 | 7/1988 | Suzuki et al. | 235/145 R |
| 4,782,522 | 11/1988 | Kramer et al. | 379/368 |

Primary Examiner—Gary V. Harkcom
Assistant Examiner—Dale M. Shaw
Attorney, Agent, or Firm—John H. Crozier

[57] ABSTRACT

In a preferred embodiment, a hardened data terminal having a heavy cover with a small, essentially sealed, internal cavity housing electronic components; a sealed visual data display; and a keyboard mounted on a base member, which base member transmits most of the force from the punching of the keys directly to the surface upon which the terminal is placed, by virtue of a free edge of the base, in proximity to the keyboard, which directly contacts the surface upon which the terminal rests. The balance of such force is transmitted to the surface by the cover which is a relatively heavy single-piece casing and which has a relatively large area contacting the surface. The terminal housing may be assembled using only adhesives and as few as two screws.

24 Claims, 4 Drawing Sheets

HARDENED SHOP-FLOOR DATA TERMINAL

BACKGROUND OF THE INVENTION

1. Field of the Invention

This invention relates to data processing terminals, in general, and, more particularly, to such a terminal that is "hardened" to make it suitable for environmentally harsh applications requiring ruggedness.

2. Background Art

Data processing terminals have a wide variety of applications and are found in a broad range of environments where they are typically used for digital data input and/or data processing. Usually, a data processing terminal, in its elemental form, includes an external keyboard mounted on a housing and operatively connected to a electronic means enclosed within the housing. Visual data display means may also be included as part of the terminal.

While the present invention is useful in many applications, the principal types of uses for data terminals toward which the invention is directed are those found in manufacturing operations where the terminals may be used for shop floor data collection, time and attendance records, material tracking, and machine monitoring, for example.

When located in a manufacturing operation, such a terminal may easily be exposed to dirt, vibration, rough handling, dripping or spraying liquids, and the like. Many conventional terminals are not well suited to such applications. Some have typewriter style keyboards which are not sealed from the environment and permit ingress of foreign matter to the internal space of the enclosure where sensitive electronic elements may be located. Visual displays may also not be sealed. Probably most important, the keyboard, which takes the most physical abuse from the human operator(s), is ordinarily disposed within the terminal in such manner that the forces created when the keyboard is punched are transmitted primarily to other parts of the terminal or its enclosure. Such arrangements result in relatively short lives for the terminals, malfunctioning equipment, and unnecessary downtime.

Accordingly, it is a principal object of the present invention to provide a data terminal which is "hardened" so that it may be satisfactorily used in the harsh environments frequently found in manufacturing operations.

It is another object of the present invention to provide a data terminal that is simple and economical to manufacture.

It is a further object of the present invention to provide a data terminal that is manufactured from a minimum of parts, such minimum of parts contributing to the ruggedness of the terminal.

Other objects of the present invention will, in part, be obvious and will, in part, be apparent from the following description.

SUMMARY OF THE INVENTION

The present invention substantially overcomes the limitations of conventional data terminals by providing, in a preferred embodiment, a hardened data terminal having a heavy cover with a small, essentially sealed, internal cavity housing electronic components; a sealed visual data display; and a keyboard mounted on a base member, which base member transmits most of the force from the punching of the keys directly to the surface upon which the terminal is placed, by virtue of a free end of the base, in proximity to the keyboard, which directly contacts the surface upon which the terminal rests. The balance of such force is transmitted to the surface by the cover which is a relatively heavy single-piece casing and which has a relatively large area contacting the surface. The terminal housing may be assembled using only adhesives and as few as two screws.

DESCRIPTION OF THE PREFERRED EMBODIMENT

Figure 1:
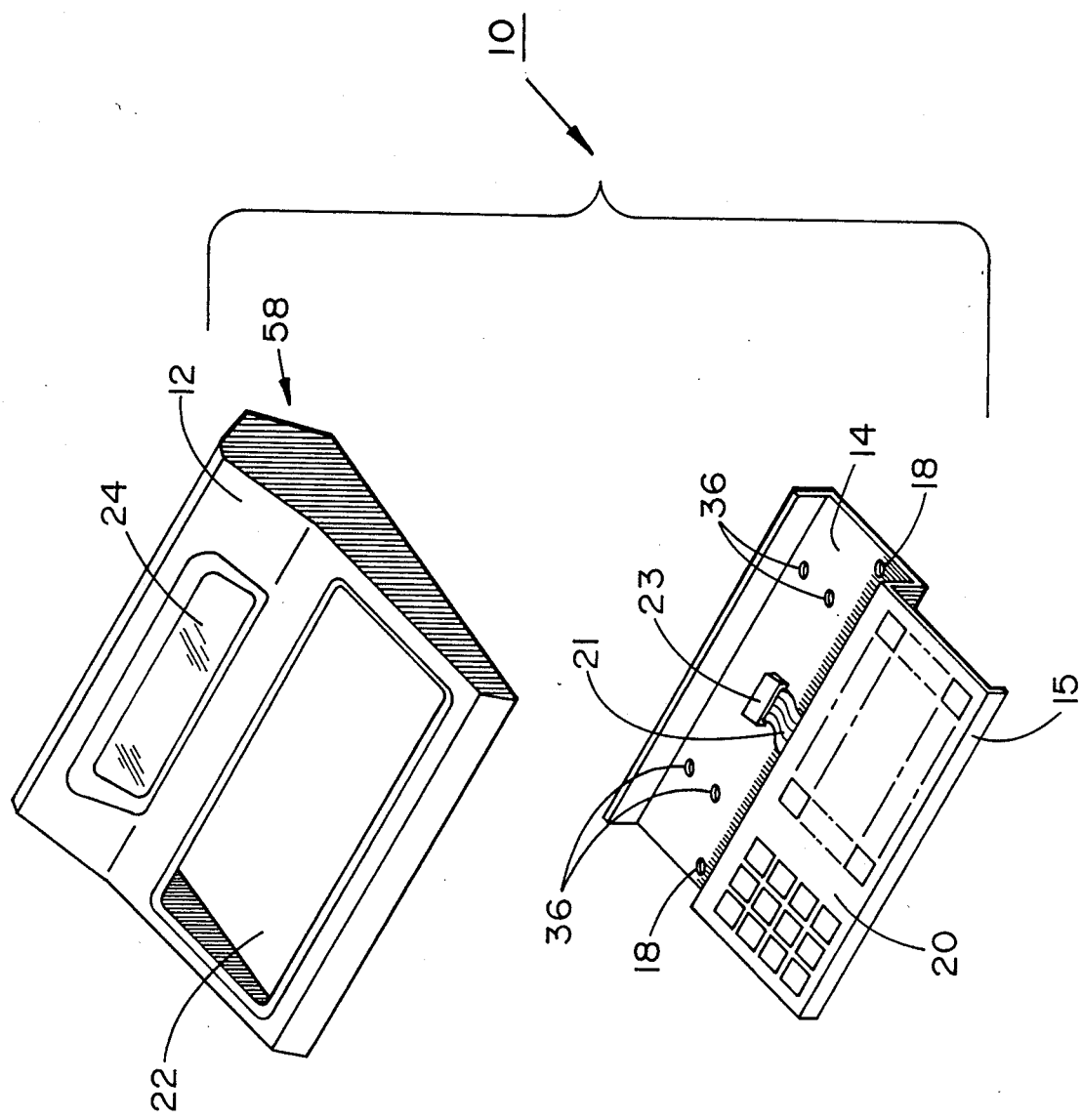
FIG. 1 is an exploded perspective view of the two primary structural elements of the terminal of the present invention.
Figure 2:
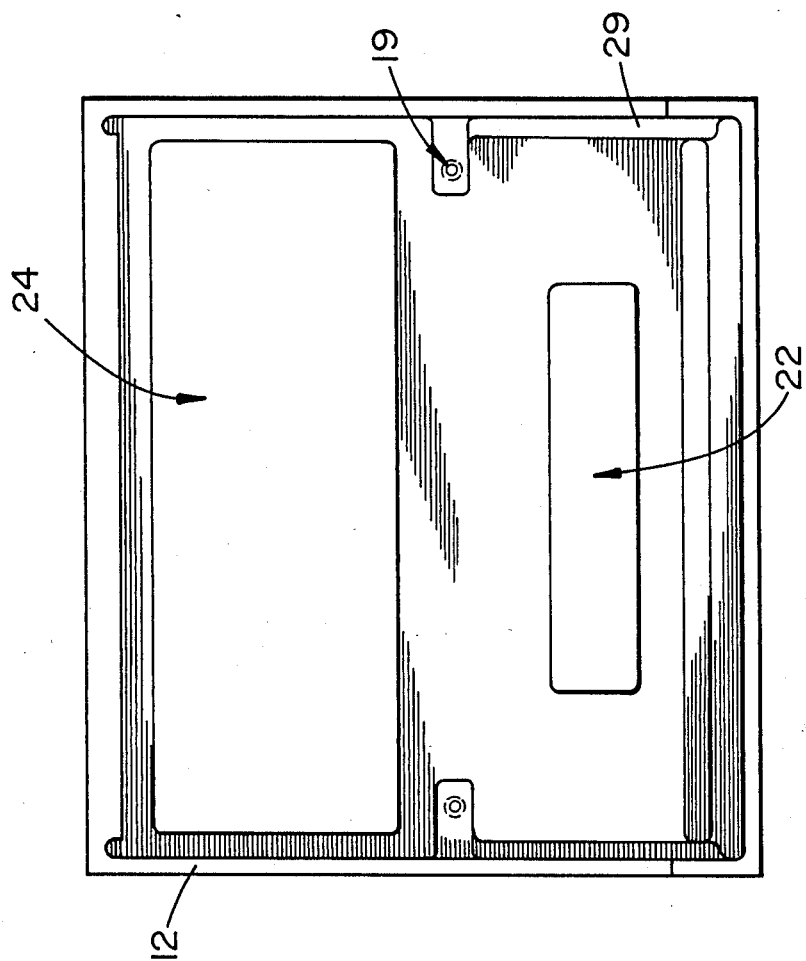
FIG. 2 is a bottom plan view looking up of the cover of the terminal of the present invention.
Figure 3:
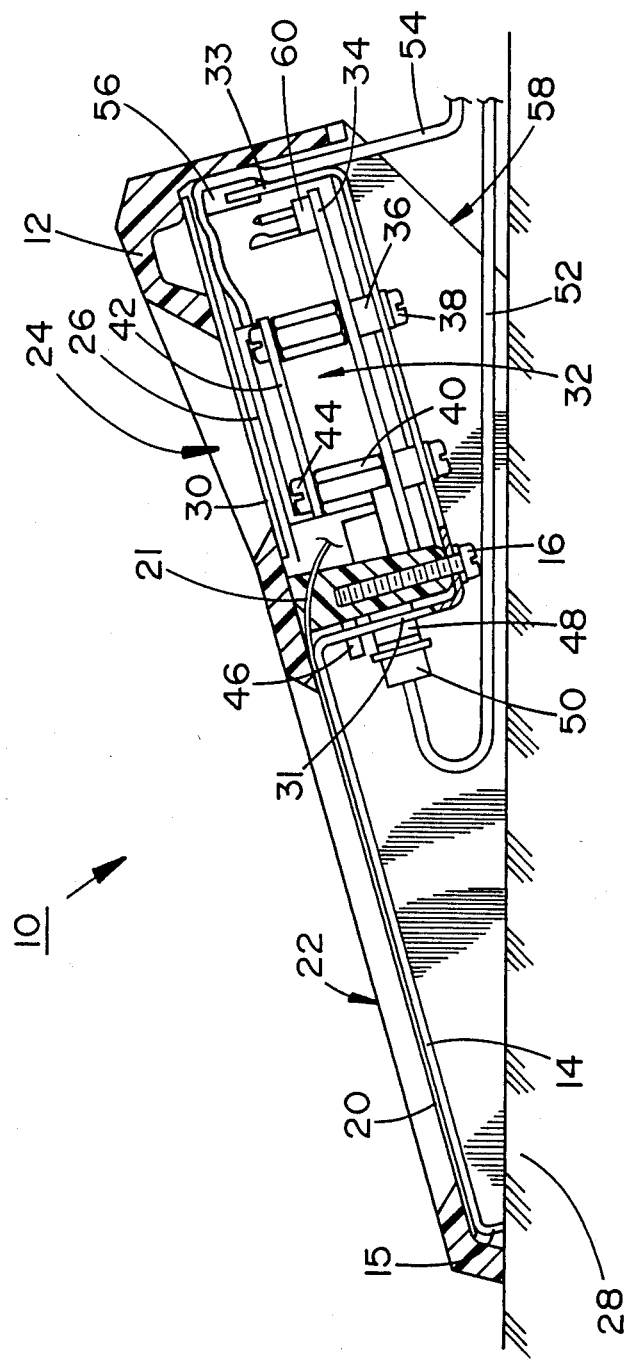
FIG. 3 is a cross-sectional elevation view of the assembled terminal of the present invention.

Referring now to the Drawing, FIG. 1 is an exploded perspective view, FIG. 2 is a bottom plan view looking up of the cover, and FIG. 3 is an assembled cross-sectional elevation view of the terminal of the present invention, generally indicated by the reference numeral 10. The main structural elements of terminal 10 are cover 12 and base plate 14 which are secured together by screws, as at 16, inserted through holes 18 in the cover into threaded holes 19 in the base. Front edge 15 of base plate 14 is essentially free and bears directly upon surface 28 on which data terminal 10 rests. Base plate 14 has mounted thereon an alpha-numeric membrane keyboard 20 which is preferrably a sealed, monolithic membrane keyboard adhesively attached to the surface of the baseplate. Alpha-numeric membrane keyboard 20 has associated therewith cable 21 and plug 23 which may be connected to internal electronic components (actual connection to components not shown. Cover 12 has defined therein opening 22 for manual access to alpha-numeric membrane keyboard 20 and may have an opening 24 for visual access to data display 26, if such a display is provided.

Cover 12 is preferably a relatively heavy metal casting and base plate 14 is preferably a relatively heavy one-piece sheet metal part which may be simply formed, as shown, in four bends. It is also within the intent of the present invention to provide a base plate having more than one edge contacting surface 28. Data display 26 may be a liquid crystal display or any other data display known in the art, the exact one used not being important to, or part of, the present invention, provided that it is suitable for the environment encountered.

When internal electronic components are provided, they are disposed in a channel-shaped portion of base plate 14 defined between an internal vertical wall 31 and a rear vertical wall 33 to form an internal chamber 32. Chamber 32 is substantially sealed by cover 12 and base plate 14 which is sealed, partially, against surfaces 29 formed in the sides of the cover, and a clear window 30 adhesively sealed and mounted to the inside surface of cover 12 surrounding opening 24. These elements together form a well-protected enclosure to house any electronic components associated with terminal 10. These components, for the embodiment shown, for illustrative purposes only, include a first printed circuit board 34 mounted on bushings 36 and secured to base plate 14 by means of screws 38 and nut/spacers 40. Data display 26 and a second printed circuit board 42 associated with the data display are mounted on and secured to nut/spacers 40 by means of screws 44. Also included in the embodiment shown are a switch 46 and a receptacle 48 both mounted in the internal vertical wall of base plate 14. Inserted in receptacle 48 is plug 50 to which is attached cable 52 which may be a cable for connection to a bar code reading wand (not shown). A communications cable 54 exits chamber 32 by passing over the rear vertical wall of base plate 14 on top of a resilient protective member 56. Cables 52 and 54 exit terminal 10 through opening 58 which extends across the lower back of cover 12. Also shown mounted on first printed circuit board 34 is a male plug 60 the purpose of which is described below with reference to FIG. 4.

Figure 4:
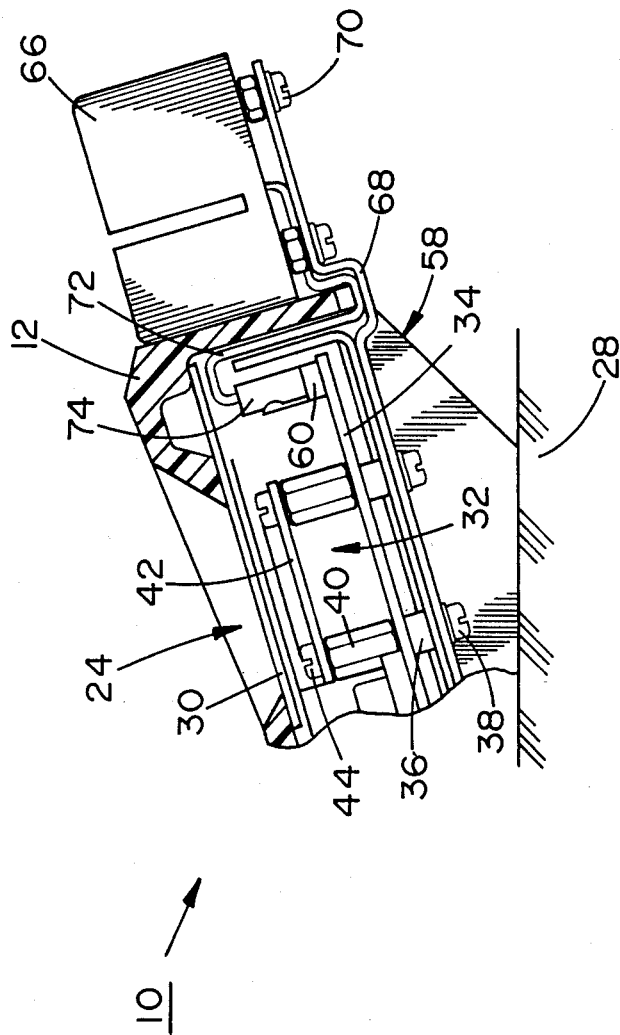
FIG. 4 is a partial side elevation view partially in cross-section of a terminal of the present invention with a slot card reader mounted thereon.

FIG. 4 is partial side elevation view partially in cross-section of terminal 10 with a slot card reader 66 mounted adjacent the rear surface of cover 12. Other data input means may be provided instead of a card reader. Card reader 66 is attached to terminal 10 by means of mounting plate 68 to which the card reader is secured by screws 70 and which is secured to base plate 14 by screws 38. Card reader 66 is electrically connected to terminal 10 by means of cable 72 and female plug 74. Cable 72 passes over the rear vertical wall of base plate 14 as shown.

An important feature of the present invention is that front edge 15 of the relatively rigid base plate 14 upon which keyboard 20 is mounted is free and directly contacts surface 28; and, as keyboard 20 is punched, most of the force of such punching is transferred directly by the base plate to the surface upon which terminal 10 rests. The balance of the force is transferred by screws 16 to the relatively heavy casting comprising cover 12 which has a relatively large area contacting surface 28. This substantially direct transfer of the punching forces to external structures greatly reduces one of the primary causes of failure of conventionally constructed terminals.

Also, as noted above, chamber 32 comprises a well protected enclosure for the electronic components associated with the terminal. There are no unsealed openings above chamber 32 and the only opening for access to the underneath of cover 12 is opening 58 at the lower rear of the cover. Keyboard 20 is monolithic and extends to the edges of the surface of base plate 14 to which it is adhesively attached. Any liquid or dirt which might pass under the edge of opening 22 would drain down away from chamber 32. Clear window 30 is adhesively sealed around opening 24 and any liquid or dirt that falls on the window cannot enter chamber 32 even if not removed immediately. Any foreign material which may enter terminal 10 around the edge of opening 22 cannot harm keyboard 20, which is sealed, and will drain or fall away from chamber 32.

Although opening 58 exposes, to some degree, the outside bottom of chamber 32, the chamber is accessible only over the top of rear vertical wall 33 of base plate 14 or by the connections on the inside vertical wall of the base which face away from opening 58. Thus arranged, chamber 32 and its contents are well protected from fairly heavy sprays of liquid or solids, even from the rear, and, of course, are completely protected from settling dust or other solid particles or liquids.

The components within chamber 32, which have been described in some detail for illustrative purposes only, are securely fastened together and are substantially isolated from the forces resulting from the punching of keyboard 20. These components and slot card reader 66, if used, are also somewhat protected from general physical shock by being mounted on a portion of base plate 14 which is cantilevered from screws 16 and therefore "floats" to some degree.

It can be seen that all components of terminal 10, in the embodiment shown, slope down toward the front of the terminal. This sloping affords convenience to the user and also permits foreign matter to drip or fall away from chamber 32.

It will thus be seen that the objects set forth above, among those made apparent from the foregoing description, are efficiently attained and, since certain changes may be made in the above constructions without departing from the scope of the invention, it is intended that all matter contained in the above description or shown in the accompanying Drawing shall be interpreted as illustrative only and not in a limiting sense.

It is also to be understood that the following claims are intended to cover all of the generic and specific features of the invention herein described, and all statements of the scope of the invention which, as a matter of language, might be said to fall therebetween.

I claim:

1. A hardened data terminal, comprising:
   (a) a planar base member having an upper surface and having a front end portion formed therein, said front end portion to contact a surface upon which said terminal rests, said front end portion being free of attachment to, or contact with, any other element of said data terminal; and
   (b) keyboard means displayed upon said upper surface of said base member, generally in proximity to said front end portion, such that a substantial portion of the punching forces resulting from the use of said keyboard is transferred directly to said surface upon which said terminal rests.

2. A hardened data terminal, as defined in claim 1, further comprising:
   (c) a cover member to which said base member is secured at an attachment point distant from said front end portion, so that said cover member transmits the balance of said punching forces to said surface.

3. A hardened data terminal, as defined in claim 2, further comprising:
   (d) visual display means visibly accessible through an opening defined in said cover member.

4. A hardened data terminal, as defined in claim 2, wherein said keyboard means is physically accessible through an opening defined in said cover member.

5. A hardened data terminal, as defined in claim 2, further comprising an internal chamber to house electronic components 6. A hardened data terminal, as defined in claim 5, wherein said chamber to house electronic components is defined by: top and sides of said cover member, a clear window covering said opening for visible access to said visual display means, and a channel-shaped portion of said base member formed between internal and rear vertical walls of said base member; such that said chamber is sealed against the ingress of foreign matter when said terminal is resting on said surface.

7. A hardened data terminal, as defined in claim 6, wherein said chamber is electrically accessible by a cable placed over the top of said rear vertical wall.

8. A hardened data terminal, as defined in claim 6, wherein said chamber is electrically accessible by means of electrical connectors in said internal vertical wall.

9. A hardened data terminal, as defined in claim 6, wherein said clear window is adhesively sealed to the inside of said cover member.

10. A hardened data terminal, as defined in claim 1, wherein said keyboard means comprises a monolithic membrane keyboard adhesively sealed to the upper surface of said base member.

11. A hardened data terminal, as defined in claim 1, wherein said base member comprises a sheet metal plate.

12. A hardened data terminal, as defined in claim 2, wherein said cover member comprises a metal casting.

13. A hardened data terminal, as defined in claim 6, wherein, when said terminal is resting on said base, the inside of said cover member is physically accessible only through an opening defined in the lower portion of the rear wall of said cover member.

14. A hardened data terminal, as defined in claim 13, further comprising data input means disposed adjacent the rear wall of said cover member and attached to said terminal by means of a plate secured to the bottom of said data input means and secured to the bottom of said channel-shaped portion of said base member.

15. A hardened data terminal, as defined in claim 14, wherein said data input means comprises a slot card reader.

16. A hardened data terminal, as defined in claim 1, wherein said data terminal slopes down toward the front thereof.

17. A hardened data terminal, comprising:
(a) a base member having at least one free edge thereof to contact a surface upon which said terminal rests;
(b) keyboard means disposed upon the upper surface of said base member, generally in proximity to said free edge, such that a substantial portion of the punching forces resulting from the use of said keyboard is transferred directly to said surface upon which said terminal rests;
(c) a cover member to which said base member is secured at an attachment point distant from said free edge, so that said cover member transmits the balance of said punching forces to said surface;
(d) an internal chamber to house electronic components, said chamber defined by: top and sides of said cover member, a clear window covering said opening for visible access to said visual display means, and a channel-shaped portion of said base member formed between internal and rear vertical walls of said base member; such that said chamber is sealed against the ingress of foreign matter when said terminal is resting on said surface; and
(e) said chamber is electrically accessible by means of electrical connectors in said internal vertical wall.

18. A hardened data terminal, comprising:
(a) a base member having at least one free edge thereof to contact a surface upon which said terminal rests;
(b) keyboard means disposed upon the upper surface of said base member, generally in proximity to said free edge, such that a substantial portion of the punching forces resulting from the use of said keyboard is transferred directly to said surface upon which said terminal rests;
(c) a cover member to which said base member is secured at an attachment point distant from said free edge, so that said cover member transmits the balance of said punching forces to said surface;
(d) an internal chamber to house electronic components, said chamber defined by: top and sides of said cover member, a clear window covering said opening for visible access to said visual display means, and a channel-shaped portion of said base member formed between internal and rear vertical walls of said base member; such that said chamber is sealed against the ingress of foreign matter when said terminal is resting on said surface; and
(e) said clear window is adhesively sealed to the inside of said cover member.

19. A hardened data terminal, comprising:
(a) a base member having at least one free edge thereof to contact a surface upon which said terminal rests;
(b) keyboard means disposed upon the upper surface of said base member, generally in proximity to said free edge, such that a substantial portion of the punching forces resulting from the use of said keyboard is transformed directly to said surface upon which said terminal rests;
(c) a cover member to which said base member is secured at an attachment point distant from said free edge, so that said cover member transmits the balance of said punching forces to said surface;
(d) an internal chamber to house electronic components, said chamber defined by: top and sides of said cover member, a clear window covering said opening for visible access to said visual display means, and a channel-shaped portion of said base member formed between internal and rear vertical walls of said base member; such that said chamber is sealed against the ingress of foreign matter when said terminal is resting on said surface; and
(e) when said terminal is resting on said base, the inside of said cover member is physically accessible only through an opening defined in the lower portion of the rear wall of said cover member.

20. A hardened data terminal, as defined in claim 19, further comprising data input means disposed adjacent the rear wall of said cover member and attached to said terminal by means of a plate secured to the bottom of said data input means and secured to the bottom of said channel-shaped portion of said base member.

21. A hardened data terminal, as defined in claim 20, wherein said data input means comprises a slot card reader.

22. A hardened data terminal, comprising:
(a) a base member having at least one free edge thereof to contact a surface upon which said terminal rests; and
(b) monolithic membrane keyboard means adhesively sealed to the upper surface of said base member, generally in proximity to said free edge, such that a substantial portion of the punching forces resulting from the use of said keyboard is transferred directly to said surface upon which said terminal rests.

23. A hardened data terminal, comprising:
(a) a sheet metal base member having at least one free edge thereof to contact a surface upon which said terminal rests; and
(b) keyboard means disposed upon the upper surface of said base member, generally in proximity to said free edge, such that a substantial portion of the punching forces resulting from the use of said keyboard is transferred directly to said surface upon which said terminal rests.

24. A hardened data terminal, comprising:
(a) a base member having at least one free edge thereof to contact a surface upon which said terminal rests;
(b) keyboard means adhesively sealed to the upper surface of said base member, generally in proximity to said free edge, such that a substantial portion of the punching forces resulting from the use of said keyboard is transferred directly to said surface upon which said terminal rests; and
(c) a cover member, comprising a metal casting, to which said base member is secured at an attachment point distant from said free edge, so that said cover member transmits the balance of said punching forces to said surface.

* * * * *